United States Patent Office 2,806,799
Patented Sept. 17, 1957

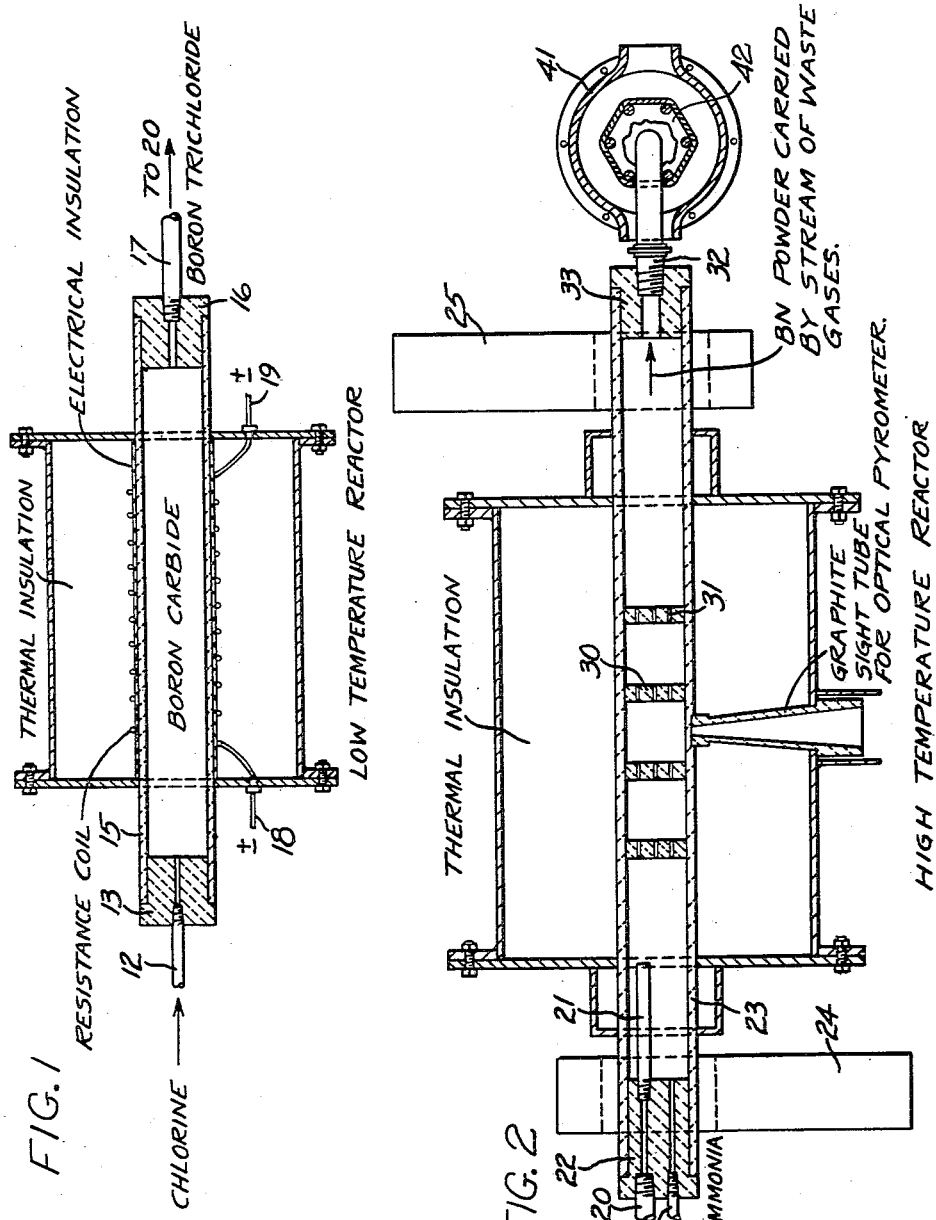

2,806,799
PROCESS OF MOLDING BORON CARBIDE AND BORON

Guy H. Fetterley and George R. Watson, Chippawa, Ontario, Canada, assignors to Norton Company, Worcester, Mass., a corporation of Massachusetts Application December 2, 1954, Serial No. 472,612, which is a division of application Serial No. 380,472, September 16, 1953. Divided and this application December 31, 1954, Serial No. 479,179

1 Claim. (Cl. 106—43)

The invention relates to boron carbide and provides an improved process for the manufacture thereof. This application is a division of our copending application Serial No. 472,612, filed December 2, 1954, which was a division of our copending application, Serial No. 380,472, filed September 16, 1953, which was a continuation-in-part of our copending application Serial No. 243,704, filed August 25, 1951, now abandoned.

An object of the invention is to provide a method for molding boron and also for molding boron carbide having more boron therein than is represented by the formula $B_5C$. Another object of the invention is to provide solid pieces of boron carbide having more boron than is represented by the formula $B_5C$ and to provide solid pieces of relatively pure boron. Previously it was impossible to make molded boron carbide having substantially more boron therein than is represented by the formula $B_5C$ because boron carbide had to be molded in graphite molds or in carbon molds and if such boron carbide had less carbon than is represented by the formula $B_5C$ it would pick up enough carbon from the mold to produce pieces having as much carbon therein as is represented by the formula $B_4C$ or nearly so much thereof. For the same reason therefore it was previously impossible to produce molded pieces of boron because the only known way to mold boron was to mold it in a graphite or in a carbon mold and such boron being so molded would pick up carbon to produce boron carbide having almost, if not quite, as much carbon as is represented by the formula $B_4C$.

Other objects will be in part obvious or in part pointed out hereinafter.

The accompanying drawings illustrate apparatus which can be used to carry out our process for manufacturing boron nitride.

Figure 1 is a sectional view of a low temperature reactor for the production of boron trichloride and Figure 2 is a sectional view of a high temperature reactor for the production of boron nitride from the boron trichloride and ammonia, and also a sectional view of a filter connected to the high temperature reactor.

The equipment consists of three operating units, which are listed below:

(1) A low temperature (900° C.) reactor in which chlorine and boron carbide react to form boron trichloride and carbon.

(2) A high temperature (1600–2200° C.) reactor in which boron trichloride and ammonia react to form solid finely divided BN suspended in a stream of gaseous by-products.

(3) A refractory and corrosion-resistant filter in which the boron nitride is separated from the hot waste gases.

We consider first the low temperature reactor. We provide a controlled source of dry chlorine, which is led into the reactor by an Inconel pipe 12. The pipe 12 is screwed into a tapped hole in the graphite plug 13 at the inlet end of a graphite tube 15. At the outlet end of the graphite tube 15 is a graphite plug 16, into which passes a small mild steel tube 17. While dimensions are not critical, a graphite tube 15 that is three inches in inside diameter and three feet long is convenient and readily available.

The graphite tube 15 is packed with crude boron carbide in the form of roughly crushed lumps or grain. It is heated by a coil of resistance wire insulated from the tube by a few layers of asbestos paper and refractory cement and ending in leads 18 and 19. As indicated in the drawing the temperature along the central part of the tube is about 900° C. and the bulk of the boron carbide is heated to this temperature. The reaction between chlorine and boron carbide is represented by the following equation:

$$B_4C + 6Cl_2 = 4BCl_3 + C$$

and is quite exothermic. Because of the heat evolved by the reaction it is necessary to adjust the power input to this reactor carefully to avoid excessive heating. Boron trichloride boils at about 13° C. at atmospheric pressure and therefore flows out of tube 17 as a gas.

We consider next the high temperature reactor. Gaseous boron trichloride enters through a mild steel tube 20 that is screwed into a tapped hole in a graphite plug 22 in the end of a graphite tube 23, which may be three inches in inside diameter and five feet long. A small graphite tube 21 screws into the inside face of the plug 22 and extends several inches, such as five inches, into the tube 23 beyond the plug 22. The temperature at the exit end of the tube 21 is about 500° C. The graphite tube 23 is heated by an electric current at low voltage and high amperage through the water-cooled electrode clamps and bus bars 24 and 25, and its temperature is measured at intervals with an optical pyrometer.

We provide a second hole in the graphite plug 22 at the inlet end of the main tube 23 of the high temperature reactor, through which we introduce gaseous ammonia by means of a mild steel pipe 26 that is screwed into a tapped hole in the plug 22. Note that the two gaseous reactants are introduced at separate points to avoid plugging by boron nitride and by ammonia chloride condensed by the cool entering gases. Thus boron trichloride and ammonia meet, mix, and begin to react at a point in the tube 23 that is at a temperature of about 500° C. Any leaks at the end of the tube are quickly plugged by condensed ammonium chloride. The gaseous mixture advances through the tube 23, encountering a series of graphite baffles 30 having holes 31, to promote turbulence. These baffles 30 are located at about the centre of the tube 23 lengthwise, and in this zone the temperature is preferably about 2000° C. Four baffles are shown but the number is not critical.

A series of reactions occur in the tube 23. These reactions may be represented by the following equations:

$$BCl_3 + 6NH_3 = B(NH_2)_3 + 3NH_4Cl$$
(Formation of boramide)     (1)

$$2B(NH_2)_3 = B_2(NH)_3 + 3NH_3$$
(Decomposition of boramide into borimide and ammonia)     (2)

$$B_2(NH)_3 = 2BN + NH_3$$
(Decomposition of boramide into boron nitride and ammonia)     (3)

By refinements in reactor design it might be possible to use much of the ammonia generated by Reactions 2 and 3 to react with fresh boron trichloride by Reaction 1. If all the theoretically available ammonia were used up in this way, the overall chemical change taking place in the furnace could be represented by the following equation:

$$BCl_3 + NH_3 = BN + 3HCl \qquad (4)$$

If none of the ammonia generated by Reactions 2 and 3 is available for reaction with fresh boron trichloride, the overall chemical change is represented by the following equation:

$$BCl_3 + 4NH_3 = BN + 3NH_4Cl \qquad (5)$$

In the reactor described in this disclosure the overall reaction is somewhere between these extremes, but nearer to Equation 5 than to Equation 4.

In any practical reactor, some ammonium chloride is formed. Since this material is solid at room temperature, it eventually finds its way into the product and constitutes an undesirable impurity therein. However, if the reactor is operated at a high temperature, above 1600° C., and if the reacting gases are retained for a considerable length of time in the reactor, the following reactions go more nearly to completion:

$$2NH_4Cl = 2NH_3 + 2HCl = N_2 + 3H_2 + 2HCl \qquad (6)$$

Since all the by-products on the right are non-condensing gases, boron nitride is the chief solid product of the reaction and is easily collected in a filter. The exit end of the reactor tube 23 is fitted with a graphite plug 33. To avoid the formation of drifts of powdered boron nitride, a short pipe of large diameter 32 leads to a standard commercial filter 41 which uses woven glass cloth 42 as a filtering medium to resist the corroding effect of hot hydrogen chloride. The connecting pipe 32 can be a section of standard steel pipe, but should be kept cool by an air blast or by water cooling to avoid the formation of volatile iron chlorides that may find their way into the product.

It is necessary to operate the high temperature reactor with a slight excess of ammonia. If this precaution is not taken, some of the relatively costly boron trichloride remains unused. An even worse result is that some of the unused boron trichloride is adsorbed by the finely divided boron nitride, is eventually hydrolyzed by atmospheric moisture, and leaves an undesirable residue of boric acid in the boron nitride as an impurity. There is no danger of this result if we use as much ammonia as indicated by Equation 5. If the reactor operates with a long entry zone at a temperature below 1000° C. and with considerable turbulence in this zone, much of the ammonia released by Equations 2 and 3 will be recovered, and the ammonia flow to the reactor can be reduced. In each individual case the operator will have to adjust the ammonia flow to obtain a good yield, and since ammonia is cheap, it is usually best to work with a fairly large excess of it.

Evidently the gases leaving the high temperature reactor consist of hydrogen chloride and a variable amount of nitrogen and hydrogen. They carry in suspension finely divided boron nitride and a variable amount of solid ammonium chloride. The filter illustrated having the woven glass cloth 42 catches 60%-80% of the boron nitride. After running the process for a length of time calculated to deposit the desired amount of boron nitride in the filter 41, the full filter can readily be replaced with an empty one without stopping the process. It is possible to recover the hydrogen chloride from the waste gases in a scrubber to make hydrochloric acid, and to burn the residual gases, which are rich in hydrogen, as a fuel.

In the high temperature reactor there is a considerable quantity of ammonium chloride vapor. This vapor begins to condense at any temperature below about 500° C., forming a white glassy solid that quickly plugs the apparatus and renders it completely inoperative. It is therefore very desirable to maintain a temperature of at least 480° C. at every point in the high temperature reactor where free passage of gases is desired. We note that this property of ammonium chloride is advantageous in one way, since the glassy condensate very quickly seals any leaks that may appear around the graphite plugs 22 and 23.

If the so-called "high temperature" reactor is operated at temperature below about 1600° C., Reaction 6 becomes slower. In fact, the lower the temperature, the more slowly Reaction 6 proceeds, and the more ammonium chloride vapor there will be in the gases leaving the furnace. If the filter is operated at a temperature below 500° C. some or all of the ammonium chloride will condense and appear as a contaminant in the boron nitride. It is difficult to design a filter that will operate effectively at 500° C. or higher, and it is also very difficult to replace a full filter heated to this temperature with an empty one without oxidizing some of the boron nitride by exposure to the air. So therefore we prefer to operate the filter at temperatures well below 500° C. preferably below 100° C. and, in order to keep the ammonium chloride content as low as possible, the temperature somewhere in the high temperature reactor where the gases pass should be at least 1600° C. Too much ammonium chloride results in plugging of the apparatus.

We have found that, in order to obtain a very high purity boron nitride the product collected by the filter should be fired preferably up to about 2000° C. although firing it at 1000° C. greatly beneficiates it. For firing the boron nitride we pack it in a graphite mold, seal the ends of the mold with graphite plugs and place the mold in a furnace. The furnace described and illustrated in U. S. Letters Patent No. 2,125,588 to Ridgway can be used and it is not necessary to use pressure, but if pressure is used the product will be a solid piece of boron nitride. This step converts most of the boramide and/or borimide to boron nitride and drives off the content of HCl and NH₄Cl.

The firing of the product collected in the filter makes the boron nitride resistant to moisture and without this step it decomposes in moist air. Because it volatilizes residual impurities and converts any residual boramide and/or borimide to boron nitride, we have succeeded in producing boron nitride at least 98% pure.

The surprising fact is that pure or nearly pure boron nitride cannot be hot molded to as high a density as the impure boron nitride taken directly from the filter. This latter material can be hot molded into solid pieces of near theoretical density at pressures of at least 500 pounds to the square inch (there is no upper limit if the mold is strong enough) and at a temperature of at least 1600° C. and not greater than 2300° C. Thus we have invented a process for the molding of boron nitride which, being an unctuous powder, could not previously be molded to zero porosity. Our molded boron nitride has a purity of better than 98% by weight since the hot molding operation is also a firing operation.

Molded boron nitride has one very important use in that, if made into a mold, it can be used to mold boron carbide having more boron than is represented by the formula B₄C and it also can be used to mold relatively pure boron without adding any carbon to the product. As previously explained such compositions could not heretofore be molded without conversion of the product to substantially B₄C. In order to make such a mold we simply make a sleeve of boron nitride by the technique fully described in U. S. Patent No. 2,535,180 issued on application of one of us, to wit, George R. Watson. This patent fully described the apparatus and method of hot pressure molding refractory material which can be so molded. Making a thin boron nitride sleeve according to the technique of the aforesaid Watson patent we also make boron nitride mold plungers by the technique described in Ridgway's aforesaid Patent No. 2,125,588, insert the sleeve into an outer sleeve of graphite, there being a press fit between the two, insert the powder to be molded inside of the boron nitride sleeve, place the boron nitride plungers in the ends of the hollow cylindrical mold thus made (these should fit the boron nitride with a close sliding fit) and then place this assembly in the molding furnace of Patent No. 2,125,588 and mold with a pressure of at least 500 pounds and at a temperature between 1600° C. and 2300° C. With regard to the pressure in this case and in all other cases mentioned in this specification the preferred pressure is the standard pressure used with the furnace which is 2500 pounds per square inch.

Boron nitride is a white unctuous powder. Its practical applications at present include:

(a) Anti-sticking agent for glass makers' molds.
(b) Component in rectifying tubes.
(c) Crucible linings and lip coatings.
(d) Insulation for induction furnaces.

However, as heretofore made, it has recently required a selling price of around one hundred twenty-five dollars a pound which has considerably restricted its use. Since it is refractory (melting point about 2730° C.) and is inert in many processes it should have wider application at lower prices. We do not have exact cost figures for our process but are confident it can be made thereby and sold (yielding a profit) at prices well below one hundred twenty-five dollars a pound.

Boron trichloride is an expensive gas when bought in bottles on the open market. By avoiding the steps of condensing, redistilling and storing the boron trichloride and instead using it up as fast as it is made, great economy is achieved. Chlorine gas in bottles is relatively cheap and we can use a low grade of boron carbide or even boron carbide old furnace mix, both of which are relatively inexpensive and readily available at electric furnace plants where boron carbide is made. The boron carbide that we use in our process does not have to be (although it can be) $B_4C$. Excess boron or excess carbon in the boron carbide (as compared with $B_4C$) in nowise interferes with our process. We are only concerned with the total amount of boron in the boron carbide that we use and practically all of it will combine with the chlorine at 900° C. leaving graphite as pseudomorphs of boron carbide. It should be added that our third primary reactant, ammonia, is relatively cheap in bottles.

One feature of the invention is the use of a graphite container (the tube 23) in which to carry out the second reaction and also the use of a graphite container (the tube 15) in which to carry out the first reaction. Ammonia and boron trichloride are highly corrosive at high temperatures but graphite will withstand them for a relatively long time. Furthermore graphite tubes are cheap. We can provide removable graphite or boron carbide liners in either or both of the tubes 23 and 15 to avoid replacement problems for a long time.

The chlorine and ammonia bottles can be replaced while the process is going on and even the exhaustion of the boron carbide in the tube 15 need not stop the process as another tube 15 charged with boron carbide and preheated to the desired temperature can be quickly substituted for the exhausted tube 15.

While we have given 900° C. as the optimum temperature for the reaction zone in the tube 15, this can be varied. We have successfully operated the process with the temperature in the tube 15 as low as 300° C., but we obtained much better yields with the inside of the tube 15 at about 900° C. We have mentioned graphite molds. However carbon molds can be used. Graphite is, in a very real sense, carbon. All carbon, however, is not graphite. Either material can be used in any part of our process. Graphite is a little more resistant so we prefer it but it is also more expensive.

*Example I*

As an example of the process of manufacture, a typical run with the equipment illustrated in the drawing is described below. The tube 15 through the low temperature reactor was three inches inside diameter and two feet long. This tube was filled with boron carbide crushed so it would pass through a sieve having four openings per lineal inch. This reactor was maintained at a temperature of 900° C. The tube 23 through the high temperature reactor was three inches inside diameter and four feet long. It was maintained at 2000° C. by measuring its temperature with an optical pyrometer through the graphite sight tube shown on the drawing.

Chlorine was introduced into the low temperature reactor through pipe 12 and the boron trichloride produced entered the high temperature reactor through pipe 20. Ammonia entered through pipe 26. The following were the feed rates.

|  | Gas Entering System | Feed rate in Grams per Minute |
| --- | --- | --- |
| Low temp. reactor | Chlorine | 9.2 |
| High temp. reactor | Boron trichloride | 10.0 |
| Do | Ammonia | 6.5 |

These proportions provided about 10 percent more ammonia than required for the reaction $$2BCl_3 + 8NH_3 = 2BN + 3N_2 + 9H_2 + 6HCl$$

The excess ammonia eliminated the possibility of any unreacted boron trichloride getting into the product, where it would react with atmospheric moisture to form boric acid. The latter material would have constituted a solid impurity in the product. This excess ammonia also made certain that none of the comparatively costly boron trichloride was wasted.

The yield of boron nitride averaged 60%-80% of theoretical. Much of it was less than one micron in particle diameter and would have been lost if the filter had not been extremely effective. We used a finely woven glass filter bag in filter 41 and a net yield of about 1.5 grams per minute was obtained.

The product caught in the filter contained about 37% boron and 47% nitrogen. In order to obtain a very high purity boron nitride the product collected by the filter was fired at 2000° C. for 30 minutes. This was done by packing the boron nitride in a graphite mold, sealing the ends of the mold with graphite plugs and placing the mold in a Ridgway furnace (U. S. Letters Patent No. 2,125,588). The mold was provided with vent holes to enable volatile material to escape. The product from this firing operation contained about 44.1 percent boron and 55.4 percent nitrogen.

*Example II*

As a specific example of the hot pressing of boron nitride we made a solid cylinder of boron nitride one inch in diameter and one inch long. A graphite mold three inches long with a bore one inch in diameter was provided together with two graphite rods or plungers one inch in diameter and three inches long. One such plunger was inserted in the hole in the mold to act as a plug so the boron nitride powder could be held within the bore of the mold. The mold cavity was then filled with boron nitride. Theoretical density was desired and we used the relatively impure product caught in the filter 41 shown in the drawing. If the fired boron nitride were used for hot pressing the end product would be well formed and strong, but it would contain about 10 to 15 percent pores. We therefore prefer to use the product as it comes from the filter (37% B, 47% N). To make a piece one inch diameter and one inch long, 35 grams of this product was poured into the mold cavity. The other plunger was then inserted and the loaded mold assembly placed in a Ridgway furnace. The furnace temperature was raised slowly to 1850° C. while a pressure of 2500 pounds per square inch was applied to the plungers. After about 20 minutes no further inward movement of the plungers took place. The mold was removed from the furnace when it was cool and the molded piece of boron nitride was then pressed out of the graphite mold. Its weight was found to be about 28 grams and its density corresponded to about 2.2 grams per cubic centimeter which is the theoretical density of boron nitride.

*Example III*

As an illustrative example of hot pressing a boron article, we made a disc of boron one half inch in diameter by one-eighth inch thick. It was desired that there be substantially no carbon in the end product and therefore a boron nitride mold was used for the operation. A boron nitride cylinder about one inch in diameter or larger with a one-half inch hole in it was fabricated by procedure as in Example II. It had an overall length of about three-quarters of an inch. Hot-pressed boron nitride plungers were provided as well by procedure as in Example II. This mold assembly was filled with the desired quantity of boron powder (0.92 gram) which was then hot pressed by procedure similar to that described for hot pressing the boron nitride. Because the boron was in contact only with boron nitride, the amount of carbon contamination was negligible. The boron article was pressed to theoretical density by applying 2500 pounds per square inch to the plungers of the mold assembly while maintaining the temperature of the mold at 1800° C. for 20 minutes.

The boron disc when removed from the boron nitride mold was found to be well formed and of nearby theoretical density (2.3 grams/cubic centimeter).

The intermediate product which is the impure boron nitride caught in the filter 41 consists of boron nitride plus boramide and/or borimide and also some ammonium chloride and possibly some occluded hydrogen chloride. We are utterly unable to give the percentage of boramide and borimide or to distinguish between the nitrogen in the boron nitride and in the ammonia or between the hydrogen in the boramide, the borimide, the hydrogen chloride and the ammonium chloride nor between the chlorine in the hydrogen chloride and in the ammonium chloride. All we can say is that the material caught in the filter 41 before firing has a boron plus nitrogen content of at least 50%, the nitrogen content being at least sufficient to combine with all of the boron to form the compound BN, the balance of the composition over and above the total boron and nitrogen being, except for less than one percent of other elements, all hydrogen and chlorine. However we do know that this material before firing is not unctious and is not useful as a lubricant whereas the fired product is unctious and is useful as a lubricant. The fired product we feel confident is at least 97% BN.

But, and this is surprising, it is the unfired product caught in the filter 41 which makes the best hot pressed boron nitride articles. Of course the hot pressing operation is in itself a firing operation: the temperature of 1850° C. is adequate to eliminate any hydrogen chloride, any boramide, any borimide and also the ammonium chloride.

The product collected in the filter 41 can be fired at as low as 1600° C. to beneficiate it and make it unctious. We usually prefer not to use temperatures above 2200° C. for this purpose.

It will thus be seen that there has been provided by this invention a process for the molding of boron, a process for the molding of boron carbide having less carbon than $B_5C$, molded boron, and molded boron carbide having less carbon than $B_5C$ in which the various objects hereinbefore set forth together with many thoroughly practical advantages are successfully achieved. As various possible embodiments may be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

We claim:

The process of molding matter ranging from boron with substantially no carbon to one atom of boron in addition to boron carbide $B_4C$, which comprises placing matter ranging from boron with substantially no carbon to one atom of boron in addition to boron carbide $B_4C$ in a boron nitride mold with at least one boron nitride mold plunger and pressing under a pressure of at least 500 pounds to the square inch and a temperature between 1600° C. and 2300° C.

References Cited in the file of this patent

UNITED STATES PATENTS

| | | |
|---|---|---|
| 2,141,617 | Ridgway | Dec. 27, 1938 |
| 2,201,049 | Moore | May 14, 1940 |
| 2,473,476 | Knowlton | June 14, 1949 |
| 2,529,333 | Finlay | Nov. 7, 1950 |

OTHER REFERENCES

Handbook of Chemistry and Physics, 27th ed., by C. D. Hodgman (Published by Chemical Rubber Publishing Co., Cleveland, Ohio), pp. 354 and 355. A copy in U. S. Congressional Library or U. S. Patent Office Scientific Library.